United States Patent Office 3,446,590
Patented May 27, 1969

3,446,590
TITANIUM DIOXIDE CONCENTRATE AND
METHOD FOR PRODUCING THE SAME
Eugene J. Michal, Metuchen, and Arnold E. Nilsen, Freehold, N.J., assignors to National Lead Company, New York, N.Y., a corporation of New Jersey
No Drawing. Filed Oct. 21, 1966, Ser. No. 588,328
Int. Cl. C01g 23/04; C22b 1/00
U.S. Cl. 23—202                    6 Claims

ABSTRACT OF THE DISCLOSURE

The present invention relates to an improved method for producing a chlorination feed material from relatively inexpensive ilmenite ores of the beach sand type by reducing the ore with hydrogen gas at relatively low temperature, separating the gangue constituents from the reduced ore, leaching the reduced ore with dilute $H_2SO_4$ to dissolve the iron from the $TiO_2$ residue and simultaneously generate $H_2$ gas and recycling the $H_2$ gas to reduce additional ore.

As used herein the term chlorination feed material has reference to $TiO_2$ concentrates used in the production of $TiCl_4$, a typical $TiO_2$ concentrate being one comprising at least about 95% by weight of $TiO_2$ and of the order of one percent or less of iron as Fe.

Prior to the instant invention the principal commercial sources of chlorination feed materials have been natural rutile ores. These ores, when upgraded by the removal of gangue material, provide concentrates having exceptionally high amounts of $TiO_2$ i.e. as high as 99%. Moreover the amount of iron will be no higher than about 2.0% with even less amounts of other metallic and nonmetallic chlorinatables. These rutile ore concentrates are therefore ideal feed materials for the production of titanium tetrachloride. Unfortunately however, the sources of natural rutile ore are almost exclusively, Australian and Florida beach sands which are not only relatively expensive but are being rapidly depleted.

While there are numerous disclosures in the literature of methods for upgrading ilmenite and other titaniferous ores to produce $TiO_2$ concentrates, to our knowledge none of these techniques has ever been sufficiently practical or economical for adoption on a commercial scale. The so called solid-state reduction processes use coke or coal as a reductant and among other deterrents the temperatures required are, with a few exceptions, extremely high, i.e. at least 1100° C. and as a consequence during reduction the $TiO_2$-bearing phase becomes iron and/or magnesium dititanate from which the iron is not easily reducible; and the dititanate phase being mobile at these high temperatures consolidates to greatly decrease the natural porosity of the reduced concentrate. When examined with a metallograph at 1,000 magnification these reduced concentrates appear relatively dense. Moreover, the metallic iron is in the form of relatively large particles for from 1 to 10 microns, or larger, some of which are solidly embedded in the dititanate phase. Hence even after leaching these reduced concentrates with $H_2SO_4$ for prolonged periods of time, i.e. two to three hours, the amount of unreduced iron, or residual metallic iron in the concentrate is relatively high which has discouraged their use commercially as a chlorination feed material.

It is also known that $TiO_2$ concentrates in the form of slags have been produced by first reducing an ilmenite ore concentrate with a gaseous reductant i.e. hydrogen, after which the reduced concentrate is melted in an electric arc furnace to produce molten iron and a $TiO_2$ rich slag. At best, such processes are complicated and costly and the slags produced are not equivalent to $TiO_2$ concentrates derived from natural rutile ores.

It is an object therefore of the present invention to provide a relatively low cost, practical process for upgrading an ilmenite ore to produce a chlorination feed material equivalent to $TiO_2$ concentrates derived from natural rutile ores. Another object of the invention is to provide a commercially acceptable process for producing clorination feed material from ilmenite ores amenable to reduction by hydrogen wherein the hydrogen reduced $TiO_2$ concentrate is leached with sulfuric acid to solubilize and separate the metallic iron therefrom and simultaneously produce hydrogen gas which is recycled to reduce additional ore.

Further objects, features and advantages will be disclosed in the more detailed description of the invention which follows.

In its broadest aspects the instant invention has its conception in the discovery that a chlorination feed material equivalent to $TiO_2$ concentrates derived from natural rutile ores can be produced at low cost and on a commercial scale from relatively inexpensive titaniferous ores provided:

(1) The titaniferous ore is one which is amenable to reduction by hydrogen; (2) the reduction temperatures used are low enough to preclude sintering or the formation of a dititanate phase and yet high enough to insure an economical rate of reaction; (3) the reduced ore is upgraded to remove the gangue material prior to leaching; (4) the gangue-free concentrate is leached with a dilute mineral acid, to dissolve and remove the metallic iron fraction from the residual $TiO_2$ concentrate and simultaneously generate $H_2$ gas, and (5) the hydrogen gas generated during leaching is dried and recycled to reduce additional ore.

ORE REDUCTION

Titaniferous iron ores and in particular ilmenite ores that are amenable to reduction by hydrogen are those wherein the ratio of ferric to ferrous iron in said ilmenite is at least about 1.0:1.0. Ilmenite ores which in their natural state fall in this category are the so-called weathered ilmenites typical of which are Quilon and Brazil beach sands.

Reduction of these weathered ilmenites is preferably carried out in a fluidizer bed type of operation wherein the ore is reduced by a hydrogen gas which has been dried so as not to have more than from 0.2% to 0.5% moisture by weight. The flow rate of the hydrogen gas may vary from 0.3 to 2.0 ft./sec. and the hydrogen is preferably heated to facilitate maintaining the fluidized ore within the desired temperature range. The temperatures used in reducing the ore will vary depending upon whether or not reduction is carried out at atmospheric or super-atmospheric pressures. For systems employing pressures of for example 100–400 p.s.i.g. the reduction temperature may lie within the range of from 540° C. to 760° C., while reductions carried out at atmospheric pressure may employ higher temperatures i.e. from 760° C. to 900° C. While the latter systems can be used successfully in the manner hereinafter described to produce low cost chlorination feed materials comparable to natural rutile $TiO_2$ concentrates the superatmospheric systems offer a higher rate of production and somewhat higher hydrogen efficiencies. After heating in the presence of hydrogen in the manner described above substantially all of the iron fraction will be converted to metallic iron. In this connection completion of reduction is measured on the basis of $H_2O$ recovery and is usually regarded as complete when 95 percent or more of the oxygen associated with the iron oxide fraction has been recovered as water in the off gases.

It is noteworthy that the reduced or metallized concentrate so produced is characterized by a porous open-grain structure within which the metallic iron is easily accessible for acid leaching.

ACID LEACHING AND HYDROGEN RECOVERY

Following reduction of the ore it is convenient to upgrade the metallized ore by separating the gangue materials therefrom so as to yield the highest possible $TiO_2$ grade concentrate after leaching. To this end the metallized ore is cooled and then passed through a magnetic separator which separates and removes the non-magnetic gangue material.

Following magnetic separation the upgraded metallized ore, sometimes referred to hereinafter as a magnetic concentrate, is leached with a mineral acid which dissolves the metallic iron, but not the $TiO_2$. A suitable mineral acid is the waste sulfuric acid produced in the well known sulfate-process for producing $TiO_2$ hydrate by digesting titaniferous iron ores in concentrated sulfuric acid. These acids are relatively inexpensive and wholly satisfactory, the acid concentration being from as low as 5% to as high as 25% $H_2SO_4$. Waste $H_2SO_4$ acids of from 5% to 15% $H_2SO_4$ and preferably from 10% to 15% $H_2SO_4$ achieve rapid removal of the metallic iron from the magnetic concentrate. In actual practice, leaching should be carried out at a temperature in the range of from 20° C. to 100° C. using a water-cut waste $H_2SO_4$ of about 10% to 15% concentration and about fifty percent in excess of that calculated stoichiometrically to dissolve all of the metallic iron in the magnetic concentrate. It has been found that under these conditions the reaction time for effecting substantially complete dissolution of the metallic iron is no more than about 30–60 minutes. Extending the leaching period for an additional two hours even at high acid concentrations accomplishes little improvement in total removal of iron. In leaching the magnetic concentrate with waste $H_2SO_4$ the metallic iron is dissolved to produce iron sulfate solution and hydrogen gas. A magnetic concentrate will, when leached in the manner hereinabove described, generate about 6.0 cubic feet of hydrogen, measured under standard conditions of 0° C. and 760 mm. Hg pressure, per pound of metallic iron in the magnetic concentrate.

It will be appreciated that during the hydrogen reduction of the ilmenite ore hydrogen will be consumed. However pursuant to the discovery of this invention a major portion of the hydrogen consumed in reducing the ore can be supplied by the hydrogen generated in leaching the magnetic concentrate with waste acid. The amount of hydrogen which can be regenerated on leaching bears a distinct relationship to the ratio of ferric to ferrous iron in the original ore. The lower the ratio of ferric to ferrous iron in the ore, the closer the hydrogen generated during leaching will come to balancing that used in the reduction of the ore. Thus a magnetic concentrate having a ferric to ferrous ratio of about 0.3:1 will, during leaching, produce about 92% of the hydrogen used in its reduction while if the ratio of ferric to ferrous iron is about 8:1 the hydrogen recovered by leaching will constitute about 70% of that used during reduction, both exclusive of minor amounts of hydrogen consumed in the reduction of small amounts of impurity oxides in the ore. In this connection it has been found also that the hydrogen generated during leaching is extremely low in impurities and hence requires a minimum of treatment and handling before being recycled.

From the foregoing it is evident that only a relatively small amount of make-up hydrogen is necessary to provide the total volume of hydrogen required for reducing fresh ore, thereby effecting a significant economy in the reduction of the ore.

Following the leaching step the iron fraction, which is now in the form of an aqueous ferrous sulfate solution, is separated from the residual $TiO_2$ concentrate by a series of filtration and washing steps until the solids have been washed substantially free of iron sulfate.

The residual $TiO_2$ concentrate is then dried. At this point it should be mentioned that one of the economic advantages of using hydrogen as a reductant, and relatively low reduction temperatures is that the particle size of the ore concentrate remains substantially unchanged. This is especially true of weathered ilmenite ores such as Quilon and Brazil beach sands and is a distinct advantage in that the $TiO_2$ concentrate produced therefrom may be used as chlorination feed material as is, i.e. it is not necessary to briquette or pelletize the concentrate.

In order to illustrate the invention further examples are given below describing the reduction of various types of weathered ilmenite ores, using hydrogen as a reductant, followed by magnetic separation, leaching with dilute sulfuric acid and the recovery of the hydrogen, and recycling the hydrogen so recovered to reduce additional ore.

Example I 10 grams of a weathered ilmenite, known as Quilon, containing 25.7% Fe(t), comprised of 22.4 percent $Fe_2O_3$ and 12.8 percent FeO, and having an average particle size in the range of from −40 to +200 mesh were heated in a tube furnace to a temperature of 850° C. by external heating means and at atmospheric pressure. Substantially dry hydrogen gas was then passed through the ore at the rate of 2 standard cubic feet/hr. for four hours the ratio of hydrogen to ore being 2.0:1 on a weight basis. At the end of the reduction period the reduced ore showed 100% of the iron fraction reduced to metallized iron and the reduced metallized concentrate exhibited an open, highly porous grain structure with the metallized iron in the form of discrete particles of from 0.2 to 1.5 microns in diameter.

The cooled metallized concentrate was then passed through a magnetic separator to remove the non-magnetic gangue materials. The magnetic concentrate was analyzed and found to comprise 68.5 percent $TiO_2$ and 30.5 percent total iron. 7.0 grams of this magnetic concentrate were then leached with an aqueous solution of waste sulfuric acid at 10% acid strength and in an amount of 8 parts by weight of sulfuric acid solution to one part magnetic concentrate. Leaching was carried out at a temperature of 65° C. for 1 hour at the end of which time the leached $TiO_2$ concentrate was separated by filtration from the spent leaching liquor. The leached $TiO_2$ concentrate was washed thoroughly with water to remove as much of the dissolved iron as possible and, as shown in Table I below, the $TiO_2$ concentrate analyzed 98.1% $TiO_2$, and 1.3% total iron. During the leaching step hydrogen was generated in an amount which constituted about 75% of the hydrogen consumed during reduction of the ore concentrate. The generated hydrogen contained 0.37%

$H_2S$ with no detectable $SO_2$ or mercaptans and when dried could be recycled to reduce additional ore concentrates.

Examples II and III

Additional test runs were made on another sample of Quilon ore and also on a Brazil beach sand. In these runs the ores were reduced at 750° C. using hydrogen gas and the reduced concentrates were then put through a magnetic separator and subsequently leached with dilute $H_2SO_4$ as was done in Example I. The accumulated data are recorded in Table I. It will be seen that at the lower reduction temperature both the $TiO_2$ and residual iron in the Quilon concentrate were slightly less than in Example I but that the concentrate nevertheless compared favorably to a natural rutile ore concentrate. The Brazil beach sand produced a $TiO_2$ concentrate having 97.5% $TiO_2$ and only 0.4% residual iron which was also an excellent chlorination feed material.

TABLE I.—HYDROGEN REDUCED ILMENITE ORES LEACHED WITH DILUTE $H_2SO_4$

| Example | I | II | III |
|---|---|---|---|
| Ore | Quilon | Quilon | Brazil |
| Fe(t) | 25.7 | 25.7 | 25.3 |
| Ratio $Fe^{+3}/Fe^{+2}$ | 1.6:1 | 1.6:1 | 8.1:1 |
| Reduction temp., °C | 850 | 750 | 750 |
| Reduction time, hrs | 4 | 4 | 4 |
| Total $H_2$ used, cu. ft | 8 | 8 | 8 |
| Ratio $H_2$/ore | 2.0:1 | 2.0:1 | |
| Reduced conc., percent reduction of Fe [1] | 100.0 | 100.0 | 100.0 |
| Magnetic conc.: | | | |
| $TiO_2$, percent | 68.5 | 68.5 | 68.1 |
| Fe, percent | 30.5 | 31.2 | 29.0 |
| Leached conc.: | | | |
| $TiO_2$, percent | 98.1 | 96.6 | 97.5 |
| Fe(t), percent | 1.3 | 1.1 | 0.4 |
| $H_2$ generated, cu. ft | 6.0 | 6.0 | |

[1] Calculated from water evolved.

In addition to the foregoing experiments which illustrate the improved process of this invention for producing relatively low cost chlorination feed material from weathered ilmenite ores, a series of additional experiments were run to show the comparative chlorinatability of these artificially produced $TiO_2$ concentrates as compared to a concentrate produced from natural rutile ores.

Chlorination of $TiO_2$ concentrates

In these tests from 35 to 50 grams of the chlorination feed materials produced by the above examples were heated in a fluidized bed chlorinator together with from 21 to 30 grams of petroleum coke the linear flow of gaseous chlorine through the bed at 850° C. being 0.36 ft./sec. The retention time of the concentrate in the bed was from 15 to 30 minutes. The data from these runs are tabulated in Table II below which also includes data showing the chlorinatability of a natural rutile $TiO_2$ concentrate.

TABLE II.—COMPARATIVE CHLORINATABILITIES OF NATURAL RUTILE $TiO_2$ CONCENTRATE AND CONCENTRATES MADE BY THE INSTANT INVENTION

| | Type Concentrate | | |
|---|---|---|---|
| Chlorination | Artificial | Artificial | Natural rutile |
| Wt. ore (grams) | 50 | 35 | 35 |
| Wt. coke (grams) | 25 | 21 | 21 |
| Coke size (mesh) | −20, +40 | −20, +65 | −20, +65 |
| $Cl_2$ ft./sec.[1] | 0.36 | 0.36 | 0.36 |
| Reaction time (min.) | 30 | 15 | 15 |
| $TiO_2$ chlorinated (percent) | 74.0 | 82.8 | 50.6 |

[1] Calculated space velocity at STP.

From the foregoing examples, it is apparent that the chlorination feed materials made by the process of this invention are comparable in chlorinatability to natural rutile $TiO_2$ concentrates.

From the description above and examples, it will be evident that the instant invention provides a new, superior and highly economical process for producing a chlorination feed material equivalent in $TiO_2$ concentration and residual iron to rutile $TiO_2$ concentrates; and equally as effective as chlorination feed material for the production of titanium tetrachloride. The process is characterized by the use of relatively inexpensive weathered ilmenite ores, using hydrogen as a reductant at relatively low temperatures and at atmospheric pressure to form highly porous readily leachable metallized concentrates which, after magnetic separation, are leached with waste $H_2SO_4$ to produce a concentrate of exceptionally high $TiO_2$ content and low metallic iron; and with the evolution of hydrogen in amounts sufficient to supply a major portion of the hydrogen required for reducing additional ore. The process is not dependent on pregrinding or pretreatment of the ore, as for example by briquetting or pelletizing, nor the use of high temperatures and pressures and these factors together with the ease and dispatch with which the reduced ore can be leached, the use of a dilute mineral acid i.e. waste $H_2SO_4$ for leaching and the recovery of relatively large amounts of substantially pure hydrogen suitable for recycling to reduce additional ore renders the process superior to any previously known methods for producing chlorination feed materials.

The invention may be carried out in other specific ways than those herein set forth without departing from the spirit and essential characteristics of the invention and the present embodiments is therefore to be considered in all respects as illustrative and not restrictive and all changes coming within the meaning and equivalency range of the appended claims are intended to be embraced therein.

We claim:

1. Method for processing an ilmenite ore to produce a $TiO_2$ concentrate comprising at least 95% $TiO_2$ and less than 1.5% iron for use as chlorination feed material in the production of $TiCl_4$ comprising the steps of: forming a bed of ilmenite ore of the type wherein the ratio of ferric to ferrous iron is in the range from 1:1 to about 8:1, reducing said ilmenite ore by heating the ore bed and passing hydrogen gas therethrough, the temperature of the heated ore bed being maintained sufficiently high to cause said hydrogen to metallize the iron fraction in said ilmenite ore, but low enough to preclude sintering, upgrading the metallized ilmenite by separating and removing the non-magnetic fraction therefrom, leaching the upgraded metallized ilmenite with a dilute acid to solubilize the metallized iron fraction and simultaneously generate at least 75% of the hydrogen gas, required for reducing additional ore, separating the solubilized iron fraction from the residual $TiO_2$ concentrate, collecting and drying the hydrogen gas generated during leaching of said upgraded metallized ilmenite, and recycling the dried hydrogen gas to reduce additional ilmenite ore.

2. Method for processing an ilmenite ore to produce a $TiO_2$ concentrate according to claim 1 wherein the particle size of said ilmenite ore is within the range of from −40 to +200 mesh by Tyler screen analysis.

3. Method for processing an ilmenite ore to produce a $TiO_2$ concentrate according to claim 1 wherein said reduction is carried out at atmospheric pressure and at a temperature in the range of from 760–900° C., and the hydrogen gas is passed upwardly through said heated ore bed at a linear velocity sufficient to fluidize said bed.

4. Method for processing an ilmenite ore to produce a $TiO_2$ concentrate according to claim 1 wherein said reduction is carried out at superatmospheric pressure and at a temperature in the range of from 540–760° C.; and the hydrogen gas is passed upwardly through said heated ore bed at a linear velocity sufficient to fluidize said bed.

5. Method for processing an ilmenite ore to produce a $TiO_2$ concentrate according to claim 1 wherein the upgraded metallized ilmenite is leached with $H_2SO_4$ at a concentration from 5.0 to 25% $H_2SO_4$ and at a temperature within the range of from 20° C. to 100° C. for from 30 to 60 minutes.

6. Method for processing an ilmenite ore to produce a $TiO_2$ concentrate according to claim 5 wherein the hydrogen gas generated during the leaching of said upgraded metallized ilmenite is dried so that its moisture content does not exceed 0.5% by weight.

References Cited

UNITED STATES PATENTS

| | | | |
|---|---|---|---|
| 1,256,368 | 2/1918 | Raffin | 23—202 |
| 2,631,941 | 3/1953 | Cole | 23—202 XR |
| 2,804,375 | 8/1957 | Kamlet | 23—202 |
| 2,914,381 | 11/1959 | Wainer | 23—202 |
| 3,060,002 | 10/1962 | Leddy et al. | 23—202 |
| 3,112,178 | 11/1963 | Judd | 23—202 |
| 3,149,963 | 9/1964 | Evans et al. | 23—202 |
| 3,193,376 | 7/1965 | Lo et al. | 23—202 XR |
| 3,291,599 | 12/1966 | Reeves | 23—202 XR |

OTHER REFERENCES

McPherson & Henderson book: "A Course in General Chemistry," Third Ed. (1927), pp. 118 and 119. Ginn & Co., N.Y. and Boston.

EDWARD STERN, *Primary Examiner.*